A. MECHWART.
Apparatus for Pulverizing and Granulating Grain, &c.

No. 241,397. Patented May 10, 1881.

A. MECHWART.
Apparatus for Pulverizing and Granulating Grain, &c.

No. 241,397. Patented May 10, 1881.

A. MECHWART.
Apparatus for Pulverizing and Granulating Grain, &c.
No. 241,397. Patented May 10, 1881.
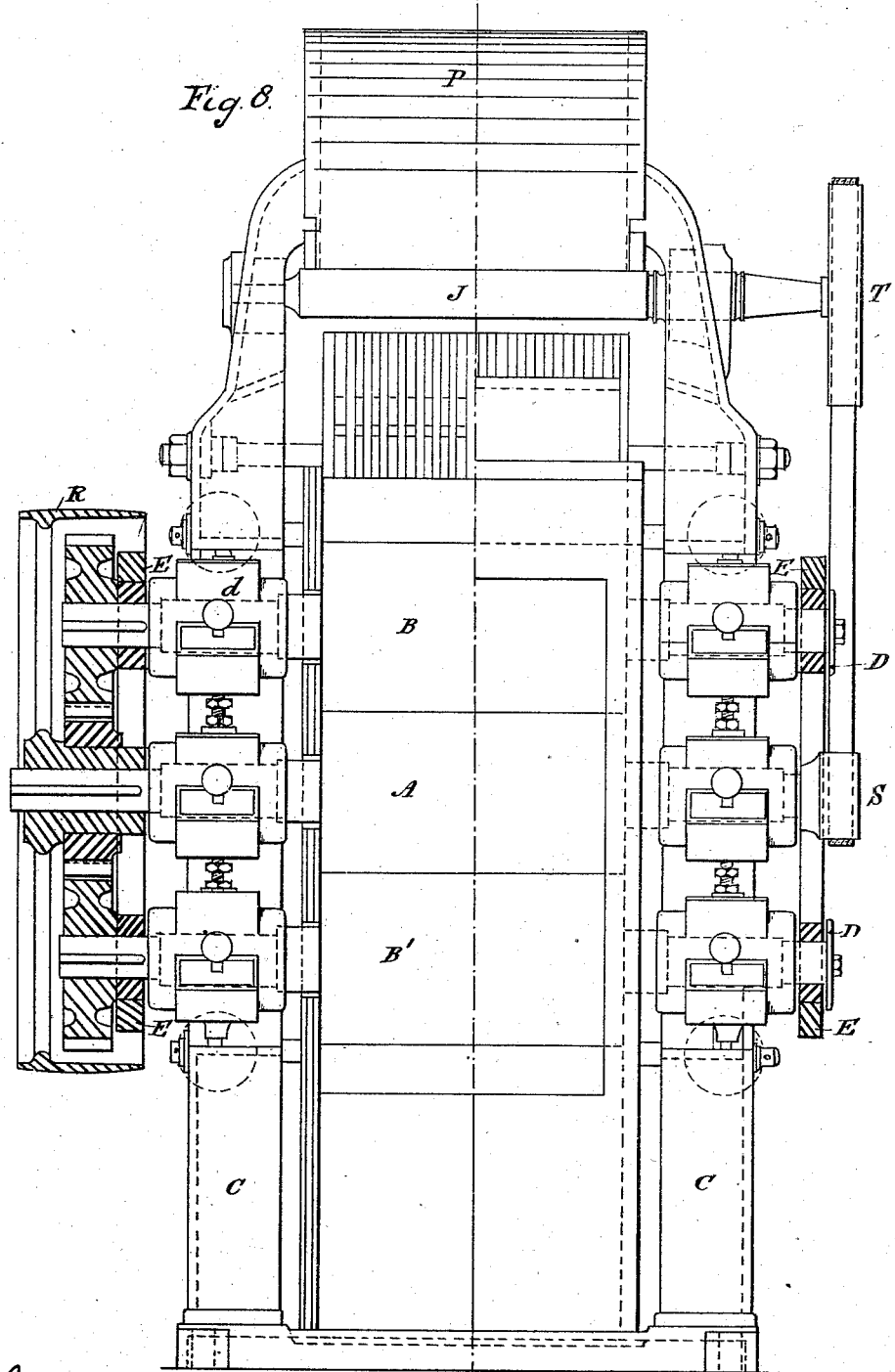

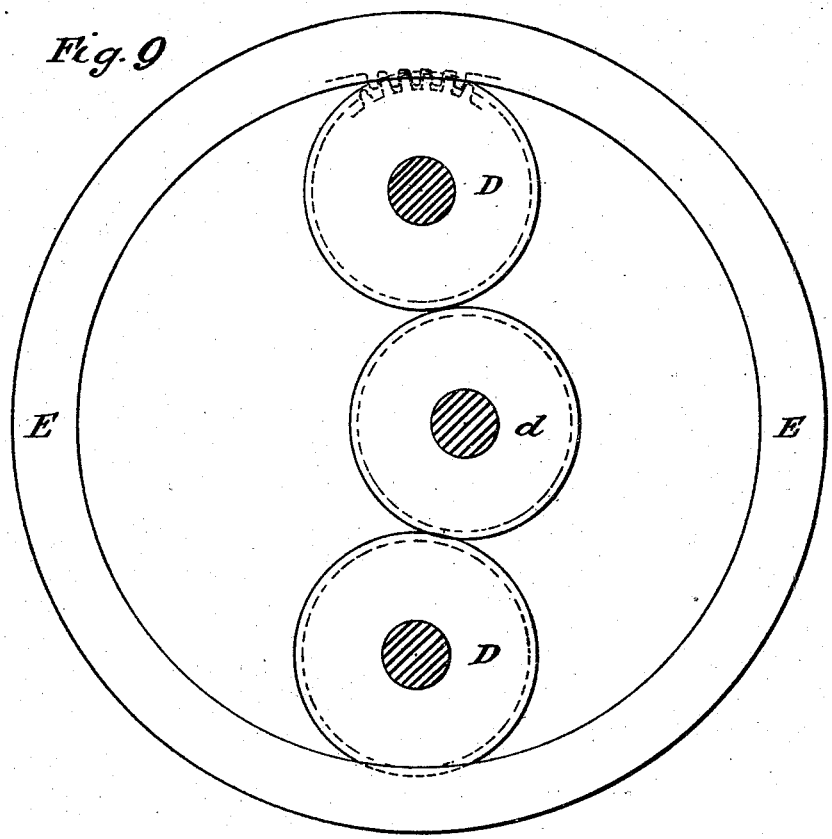

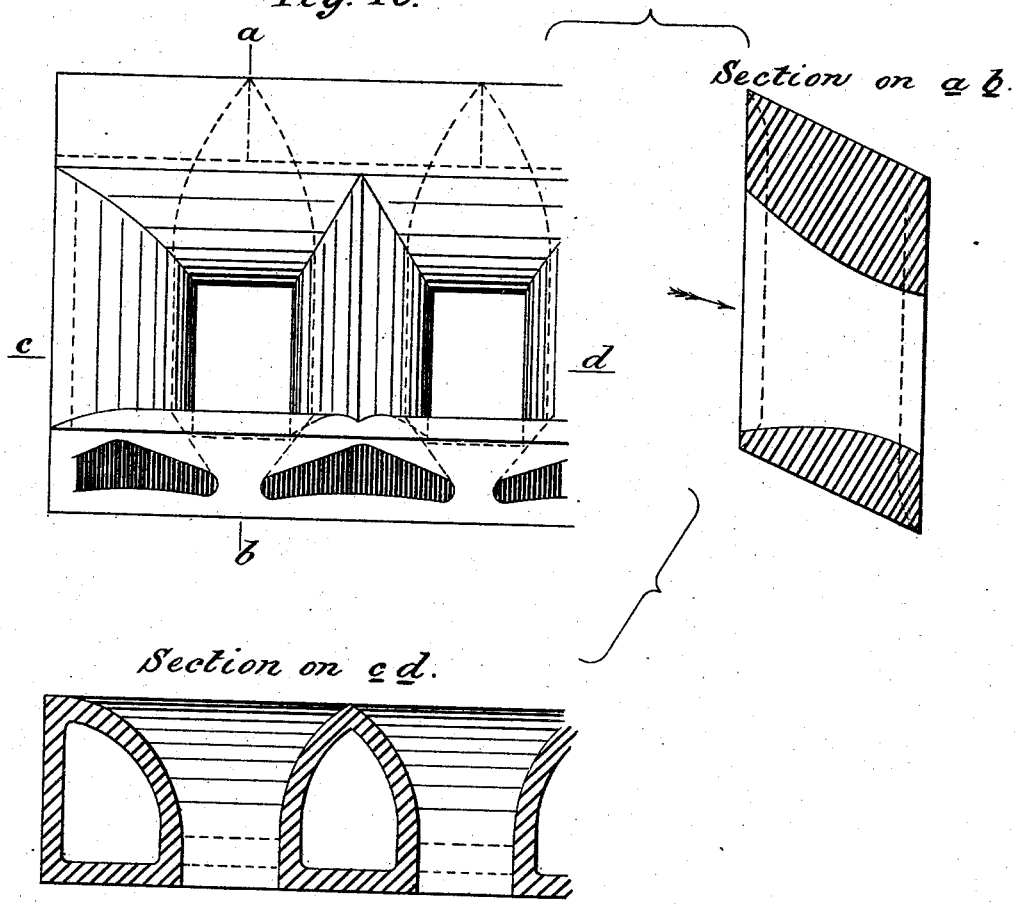

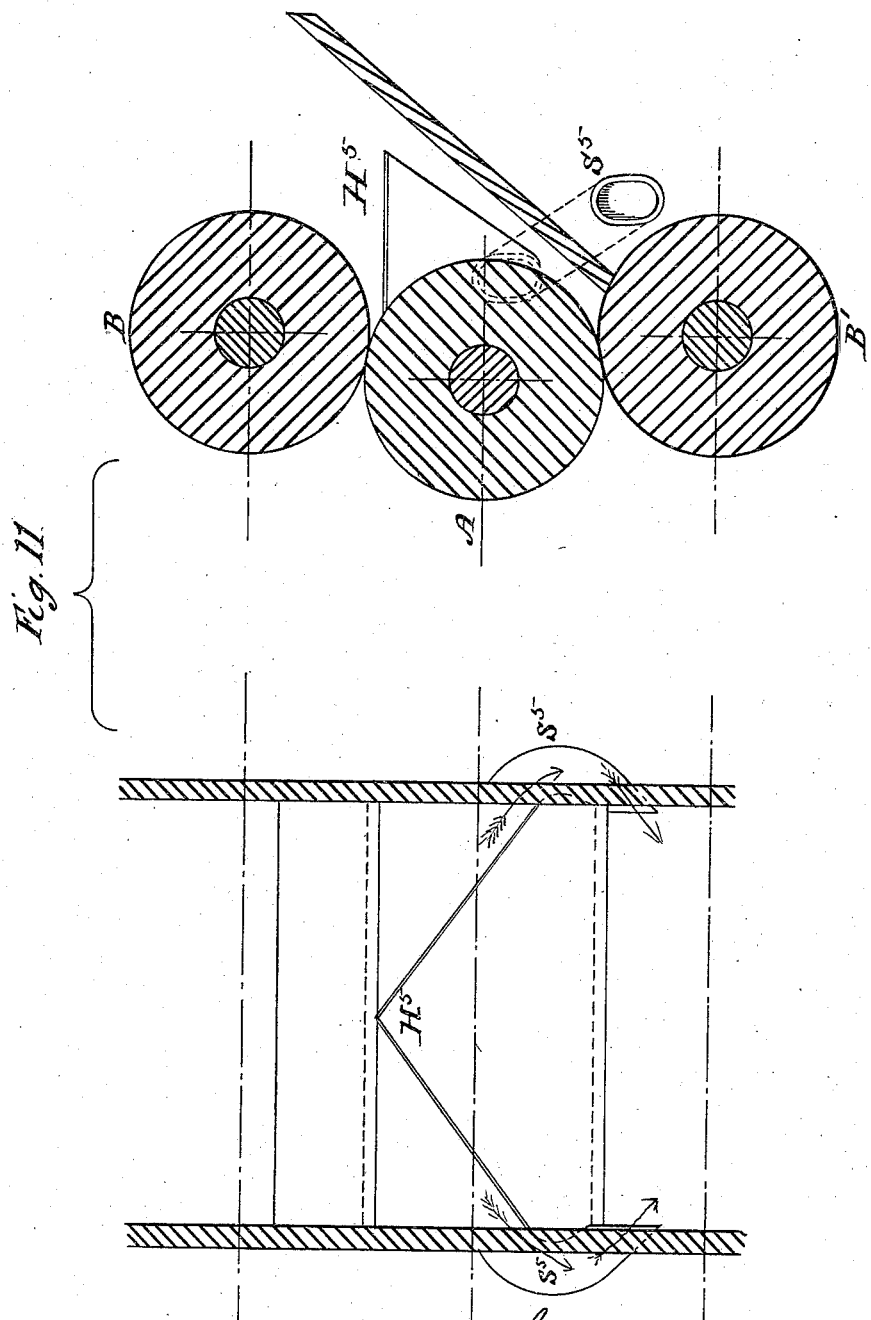

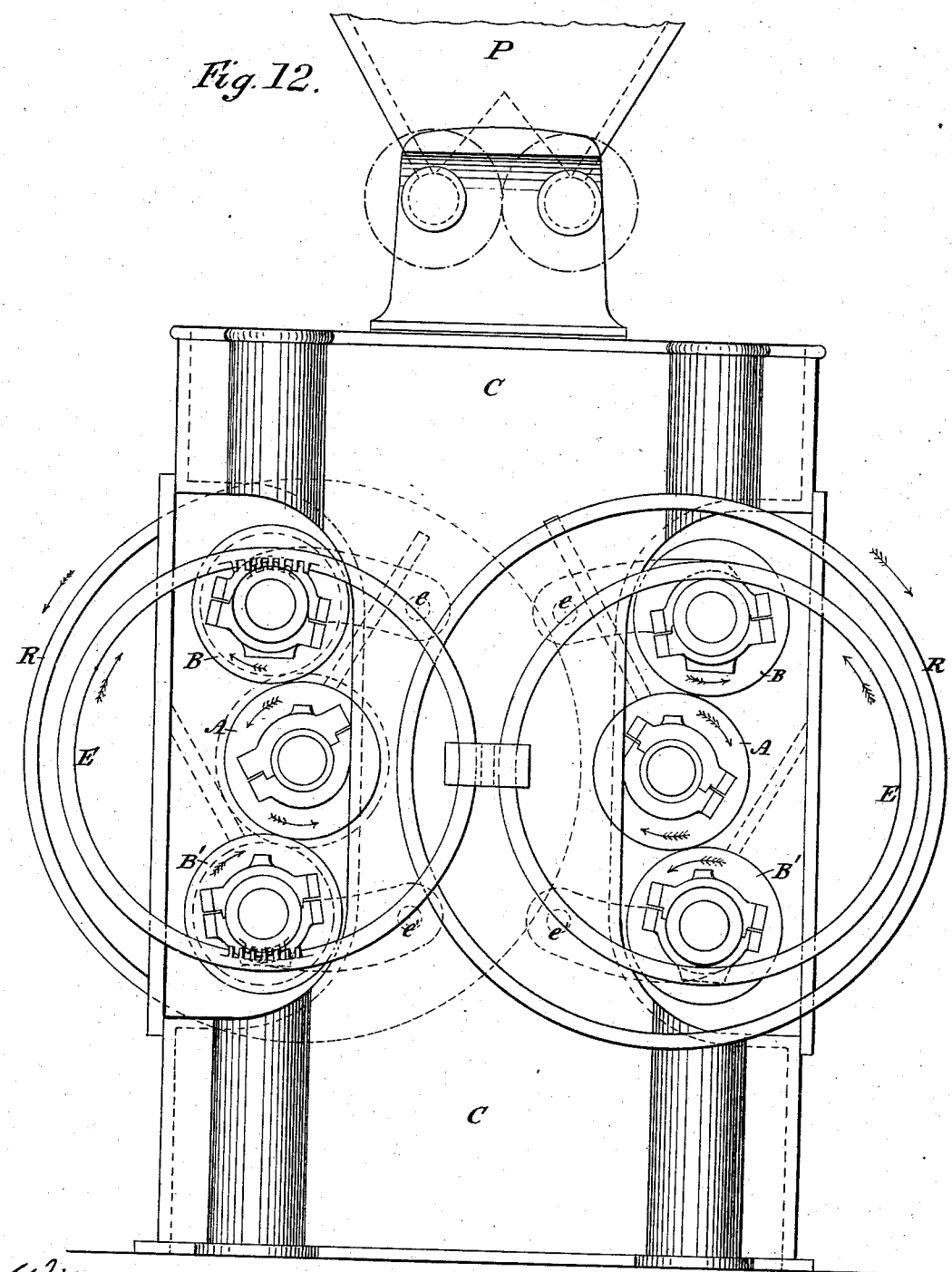

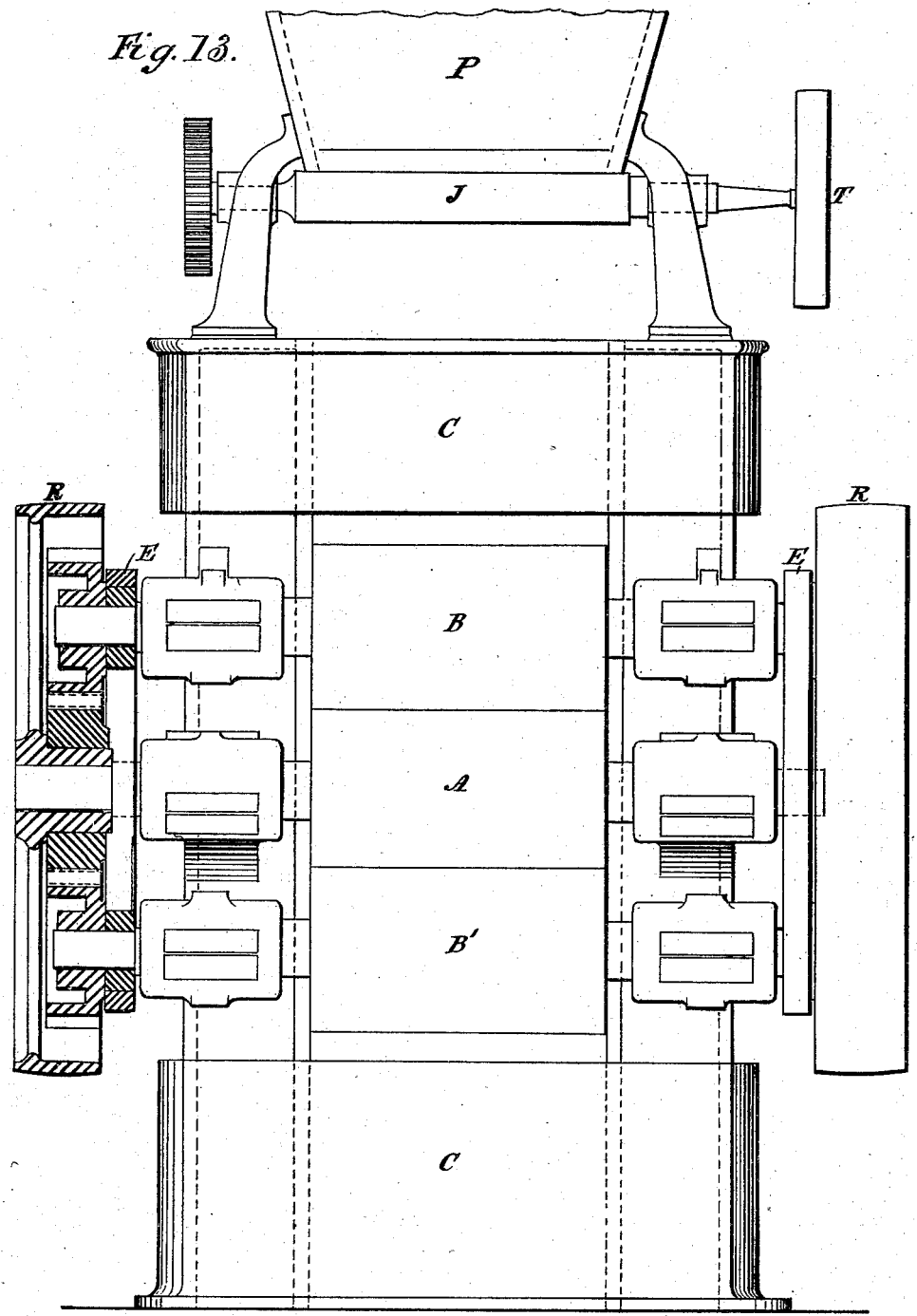

UNITED STATES PATENT OFFICE.

ANDREAS MECHWART, OF BUDA-PESTH, HUNGARY.

APPARATUS FOR PULVERIZING AND GRANULATING GRAIN, &c.

SPECIFICATION forming part of Letters Patent No. 241,397, dated May 10, 1881.

Application filed June 11, 1879. Patented in Great Britain February 11, 1878, and April 3, 1879; in Austria May 21, 1879; in Hungary May 21, 1879; in France December 18, 1878, reissued May 9, 1879; in Italy March 29, 1879, and March 10, 1879; in Germany May 4, 1879, and December 5, 1878; in Belgium May 23, 1879, and December 20, 1878.

*To all whom it may concern:—*

Be it known that I, ANDREAS MECHWART, of the firm of Ganz & Co., engineers, of Buda-Pesth, in the Kingdom of Hungary and Empire of Austria, have invented certain Improvements in Roller-Mills for Granulating and Pulverizing Grain and Seeds and for Manufacturing Flour, of which the following description, in connection with the accompanying drawings, constitutes a specification.

This invention relates to improvements in roller-mills for manufacturing flour and for granulating or pulverizing grain and seeds generally; and such improvements consist, first, in special mechanism for throwing on or taking off all pressure between the several crushing-rolls in the machine; second, in special mechanism for establishing uniform pressure between the rollers on the lines of contact therebetween throughout their entire length; third, in the employment of revolving anti-friction elastic rings embracing the ends of the axles of the top and bottom rollers of the series, and an adjustable friction-wheel, in connection with swinging journal-boxes, in which the roller-bearings revolve as a means of neutralizing and reducing friction; fourth, in improved appliances for gathering the crushed product as it is delivered from between the rolls, scraping from the surface of the rollers any adhering material, and simultaneously dividing such product and delivering a moiety thereof to conveyers or receptacles on either side of the machine; fifth, in the combination of a crushing-roll revolving in fixed bearings, with a crushing-roll revolving in bearings constructed in or attached to swinging brackets having special provisions for adjusting their pivotal attachments for purposes of regulating pressure between the rolls, as hereinafter more fully set forth.

Figure 1:
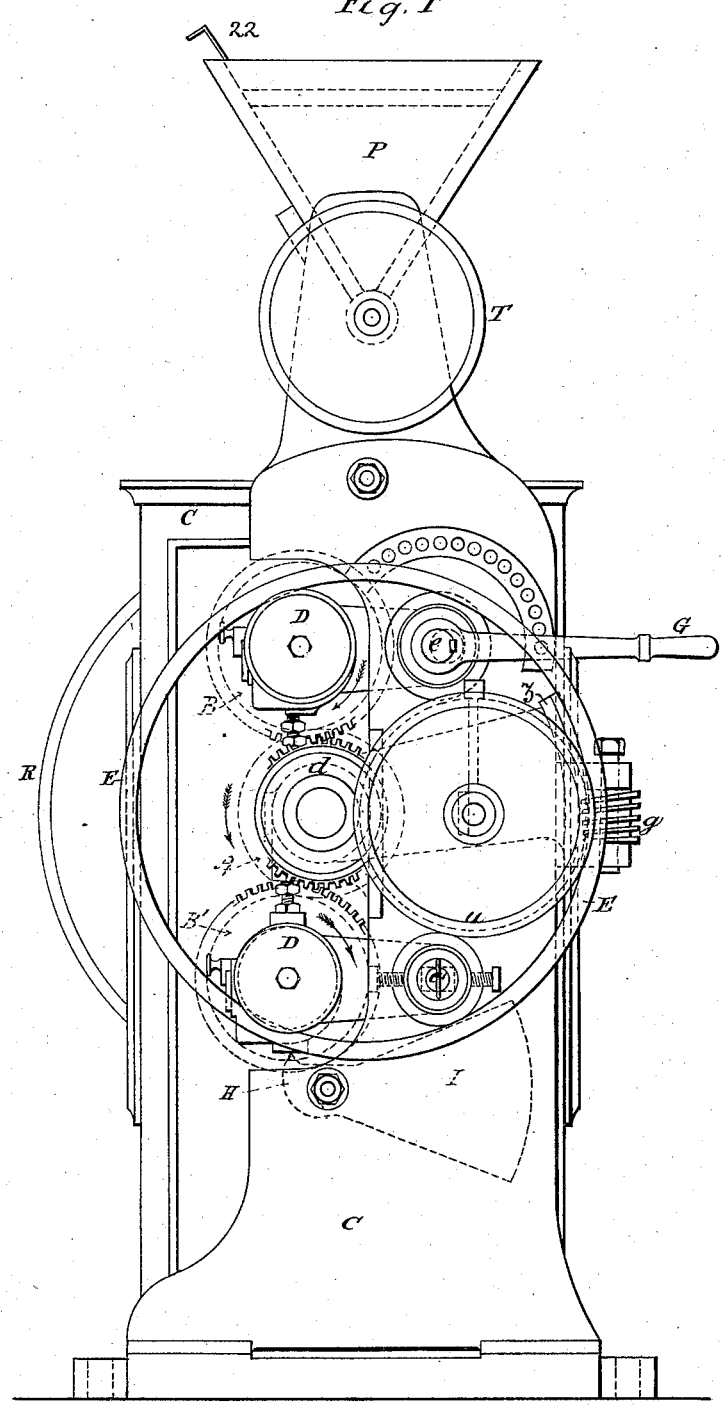
Figure 2:
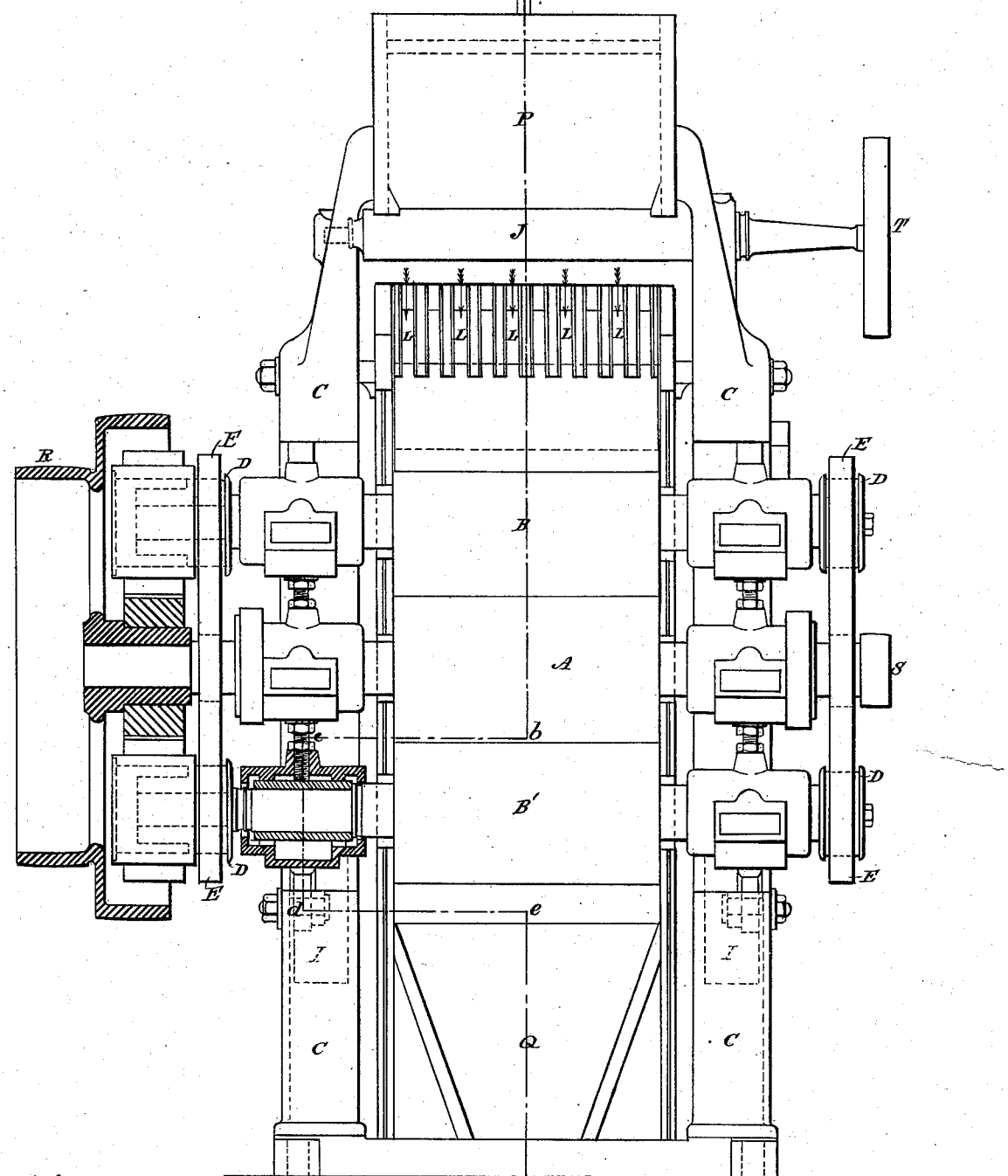
Figure 3:
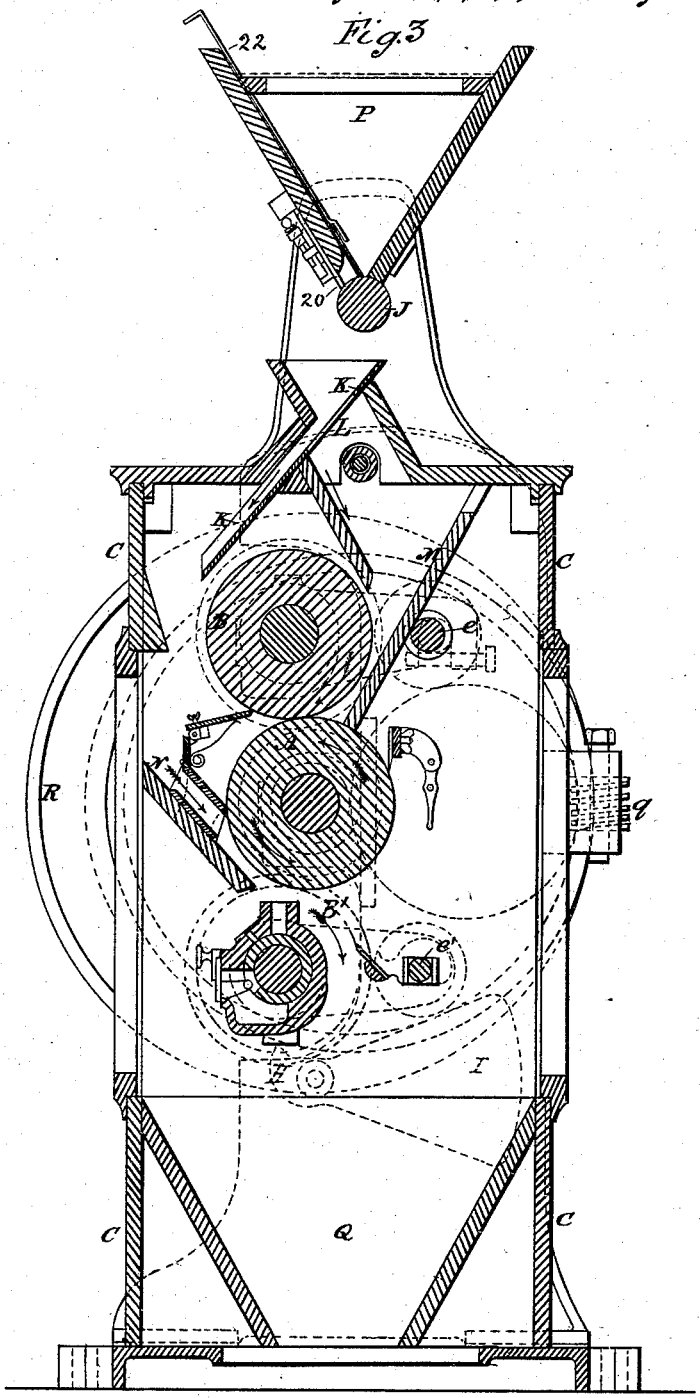
Figure 4:
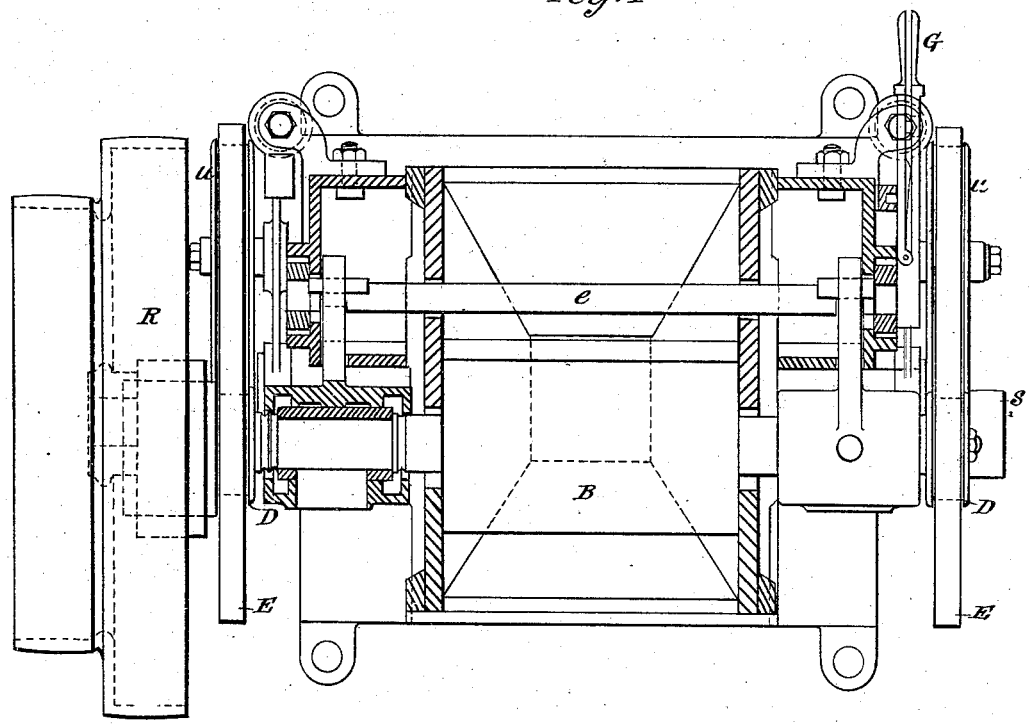
Figure 5:
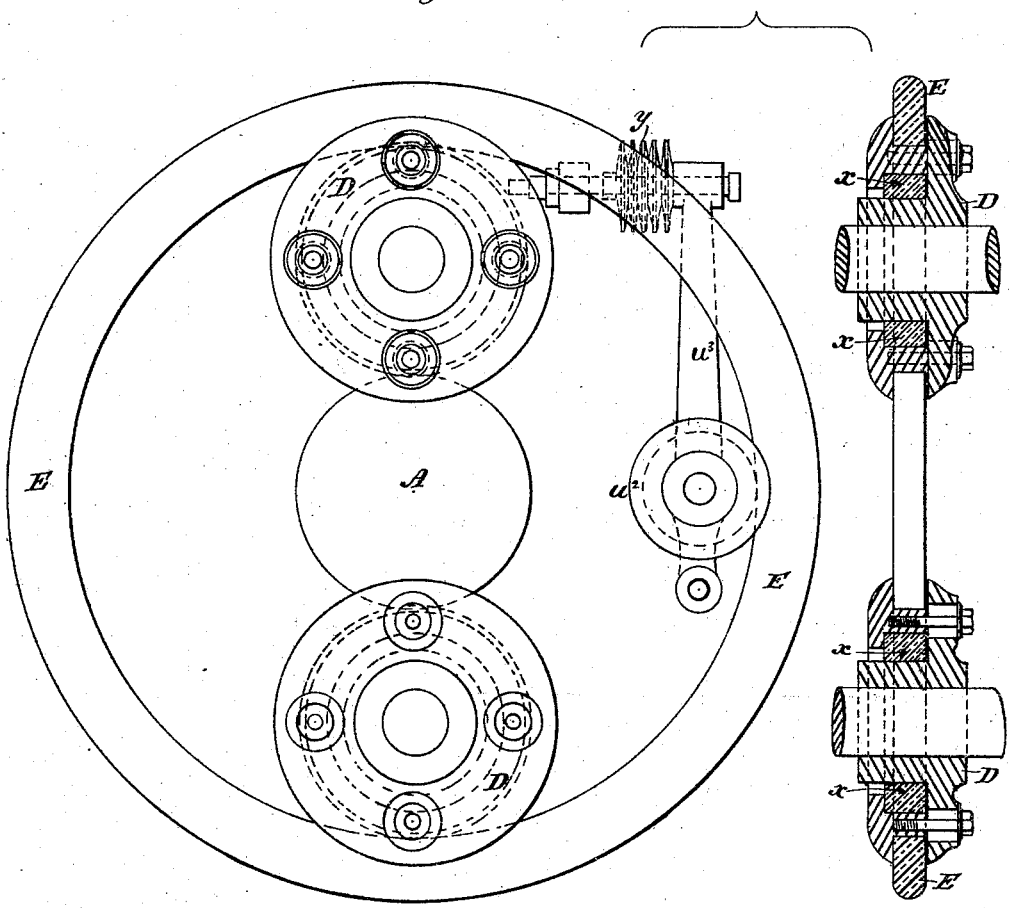
Figure 6:
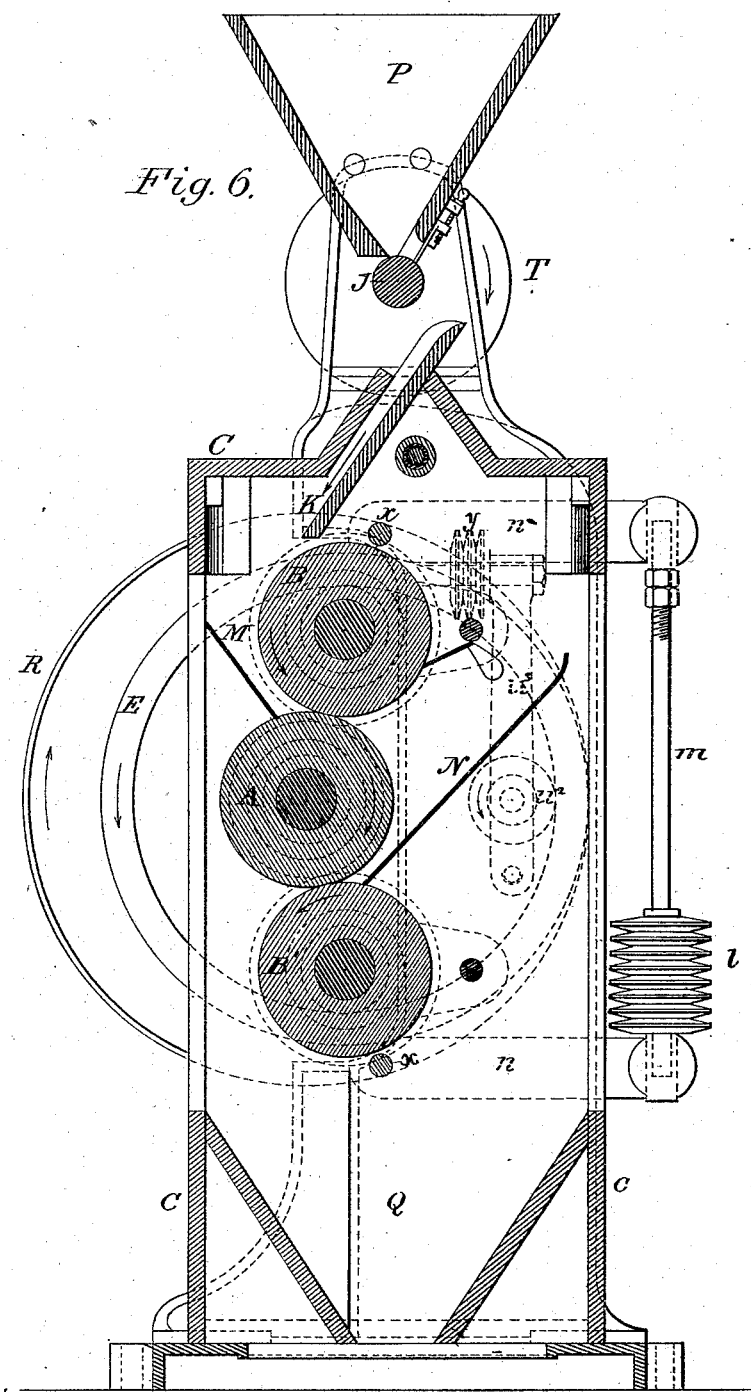
Figure 7:
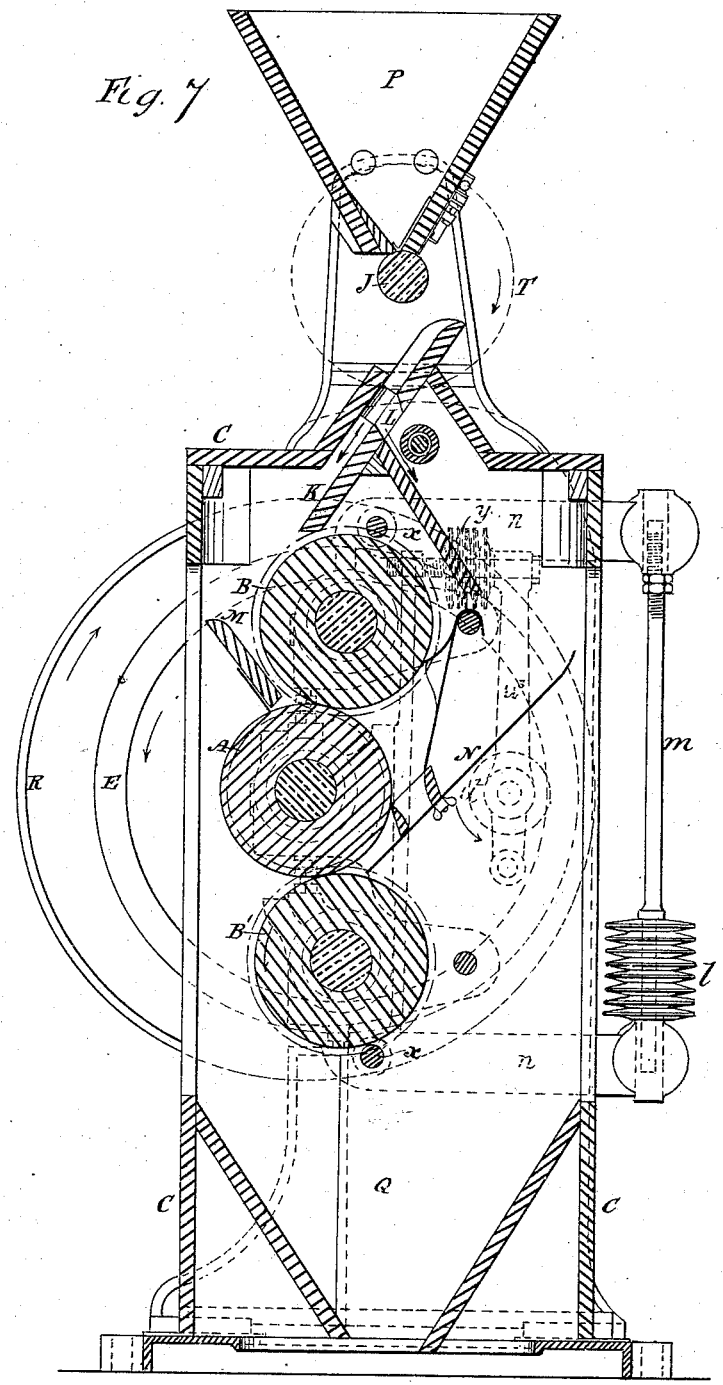

Figure 1 of the drawings presents a view, in elevation, of that side of my machine opposite to the driving-gear. Fig. 2 is a front elevation of my machine, showing a partial diametrical section through the driving-pulley, driving-gear, and one of the lower journal-boxes. Fig. 3 exhibits a vertical transverse section of my machine, taken on the line *a b c d e f* of Fig. 2, and shows, among other things, one arrangement of the chutes or conveyers for the flour or meal. Fig. 4 is a plan view of a transverse section of my machine, taken on a horizontal plane cutting the axes of crank-shaft *e* and swing-roller B, as shown in Fig. 3. Fig. 5 shows one mode of applying india-rubber or other elastic material to the bearing-surfaces of the friction-rolls to increase the elasticity of the mechanism. Fig. 6 is a vertical transverse section of my machine, showing a system of chutes, conveyers, &c., for passing the material to be crushed consecutively through both pairs of rollers. Fig. 7 shows a vertical transverse section through the center of my machine, and exhibits a system of chutes, &c., by which the feed from the feed-roll may be divided between the upper and lower pairs of rolls, so as to be crushed but once. Fig. 8 shows, in vertical diametrical section, taken through the center of the main driving-pulley, how the several rollers are geared together and such gears shrouded by the rim of the driving-pulley as well as the connection by belt between pulley on central driving-shaft and pulley on the feed-roll. Fig. 9 shows a provision, when circumstances render it necessary, to insure positive rotation of the anti-friction revolving rings by constructing the friction-rollers and the interior edge of the rings with cogs. Fig. 10 exhibits, in plan and in longitudinal and transverse sections, a prismatic casting having openings or ways for the passage of the material to be acted on, and which may serve the double purpose of a chute to guide the material and a scraper to clean the roller. Fig. 11 exhibits a device provided for scraping the surface of the roll, dividing the crushed material as it is delivered from between the crushing-rolls, and conveying a moiety thereof to either side of the machine, where it is discharged into spouts, which convey it to the meal or flour receptacle beneath the machine. Figs. 12 and 13 show, respectively, in front and side elevations, two sets of my machinery in the same case.

For the purpose of illustrating my improvements, I have shown a mill having three crushing-rolls arranged one above another, but with their axes of motion in different but parallel vertical planes, although such vertical arrangement is not essential for all purposes. The middle crushing-roll of the three, marked A, revolves in journal-boxes, which are permanently attached to the front edges of the up right jambs C C of the stand or main frame of the machine.

Above and below roll A are located the crushing-rolls B and B', respectively, which have motion imparted to them from roll A through suitable gears upon their respective shafts, as shown in Fig. 1. Such gears are of different diameters, the middle or driving gear being preferably the smallest for the purpose of imparting differential speeds to the adjacent crushing or grinding surfaces of the crushing-rolls.

Upon one end of the shaft of the middle crushing-roll is a driving-pulley, R, through which motion is communicated to the machine from any prime mover, and upon the other end thereof is a small pulley, S, from which a belt leads to the pulley T on the feed-roll shaft at or near the top of the machine.

Next outside of the journal-bearings of roller A, adjacent thereto, and pivoted upon the axles of said rollers on each side of the machine is the arm of the toothed sector z.

Upon a stud projecting from the sector-arm revolves the friction-wheel u, the axis of motion of which is so adjusted that its periphery shall at all times be in contact with the friction-roller d. Sector-arm z is adapted to swing within certain limits upon the shaft of roller A, carrying the friction-wheel u with it, and such swinging movement is limited and controlled by the worm g, attached to the main frame or uprights C C and gearing into the toothed sector of arm z.

Next in order outside of the sector-arms on the middle roller-shaft, on each side of the machine, revolves the friction-roller d.

Upon each end of upper and lower rollers, B and B', respectively, are centered and fastened the friction-rolls D D D D.

Over the friction-rollers D D, upon the ends of the shafts of the crushing-rollers B and B', respectively, at each side of the machine, the anti-friction revolving rings E E are clasped or sprung, so that each shall grasp or confine within its embrace the upper and lower friction-rolls, D D, and the friction-wheel u. When so adjusted it is designed that the center of rotation of the anti-friction rings E E shall not coincide with that of middle roller, A, but fall somewhere between the axis of A and the axis of friction-wheel u. Rolls D D and wheel u are flanged, so that ring E will keep its path of rotation.

The journal-bearings of the upper crushing-roll, B, have each an arm or bracket projecting to the rear, the extremity of which arm is pivoted to a shaft, e. (Seen in Figs. 1 and 4.) Shaft e is cranked for the purpose of forming such pivotal connections opposite such projecting arms or brackets, and is itself pivoted in adjustable boxes or bearings, as shown in Fig. 4. It is manipulated by a lever, G. The office of lever G and crank-shaft e is to throw on or take off the whole or any proportion of pressure from the rolls, which is done by simply throwing lever G over in one direction or the other. The major degree of pressure between the rolls is adjusted by means of crank-shaft e, and its connections but more delicate adjustments of pressure are regulated through the adjustment of friction-wheel u by means of worm g and sector-arm z.

The journal-bearings of bottom roll, B', are constructed in all respects like the upper pair just described, and are pivoted at their rear end to a bolt or pin, as shown at e', Fig. 1. This bolt e', where it passes through the jambs or sides of the frame, is confined in transversely-adjusted boxes by means of set-screws or otherwise, the office of which arrangement is to facilitate parallel adjustment of the bottom with the central roller, and also to compensate by adjustment for any loss by friction or natural wear of the parts while in use. These journal-boxes may be attached to a cranked pin in the same manner as the upper set, if deemed necessary or desirable.

Beneath the journal-bearings of bottom roller, B', on each side of the machine, is pivoted a weighted lever, I, of which the short arm H impinges against the under side of the journal-bearing. The function of this weighted lever so disposed is to counterbalance the weight of bottom roll, B', and its appurtenances or any superincumbent weight resting thereon.

The limit of approach of the crushing-rolls toward each other is determined by the set-screws provided therefor between the journal-boxes of the middle roller, A, and those of the upper and lower rollers, B and B'.

By the use of the foregoing-described apparatus the friction resultant from the pressure between the rolls, which ordinarily would be greatest in the journal-boxes or upon the bearings of the rolls, is principally, if not wholly, transferred to the several friction-rolls and the revolving anti-friction rings, and is thereby very materially reduced, being converted by the mechanism from sliding into rolling friction.

From a consideration of the construction and arrangement of the main rolls, provided with the friction-rolls upon their shafts or axles on either side, and running in journal-boxes provided with bracketed arms pivoted at their extremities on a cranked adjusting-shaft in connection with the sector-arms on either side of the machine, pivoted on the shaft of the middle roll, and carrying an adjustable friction-wheel on each side of the mill, said friction-wheels, upon the respective shafts and upon the sector-arms on either side, being spanned or embraced by the rotary anti-friction rings described, it will be apparent that new and useful results accrue from such arrangement and combination of parts, differing in degree and kind from any resulting from the operation of either of the essential elements of such combination when used separately.

I am aware that journal-boxes have heretofore been used provided with bracket-projections, by which the same have been pivoted, so as to permit such boxes to have a swinging movement in a plane parallel with the plane of rotation of the axle running therein; and I am also aware that adjustments of journal-boxes in direction transverse to the axis of the box by means of rotating bars or shafts provided with eccentric pivotal attachments for such boxes independent of any provisions for an oscillating or swinging movement of such boxes after such adjustment are not new. The spanning of two or more shafts or cylinders or the axes thereof by rotating anti-friction rings as a means of reducing friction of such axles in their bearings is also old.

The new or improved results effected by the use of my machine are not dependent so much upon the independent action of either or any of the above-named features which are found therein as upon the interdependent and co-operative action of some two or more of them, as I will here point out.

It may be observed that my invention is inoperative without the use of the revolving anti-friction rings. Through their agency the upper and lower swinging rolls are brought into and confined in adjustment with reference to the fixed middle roller, and through their agency the pressure therebetween is regulated and controlled, and the pressure between the central and upper rollers is equalized with that between the central and lower rolls. These rotating rings have each three bearing-points upon their internal peripheries, which are tangential to as many friction-rollers, two of which are, and all of which may be, adjustable with reference to the center of rotation of the rings. Now, assuming the lower roll to have been put in adjustment by properly determining the location of pivot-bolt $e'$, upon which the brackets of its journal-boxes are pivoted, and friction-wheels $u$ $u$ to have been put in adjustment by means of worms $g$ $g$ and sector-arms $z$ $z$, the remaining point of contact—i. e., between the ring and the upper friction-roll—may be established by forcing roller B outwardly by means of crank-shaft $e$ until the desired degree of pressure between the several crushing-rolls is attained, which degree of pressure is also measured by the distensive force thus exerted upon the rotating rings E E. Hence it is plain that the pressure between the crushing-rolls is at all times dependent upon and governed by the tension of the rings E E, and this force of distension may be exerted in this machine upon the rings by either of two methods hereinafter described or by both acting conjointly, if necessary, as follows:

First, the rings may be distended by forcing the upper swinging journal-boxes over and away from the line of the axis of friction-wheels $u$ $u$, so as to cause the friction-rolls upon the axle of said upper roll to impinge against the interior peripheries of rings E E, whereby they will be impelled toward the center of roll A or the surface of roll B caused to impinge or bear against that of A; and the same force being communicated through the ring to the friction-rollers upon shaft of roller B' exerts a corresponding influence and to the same extent upon said lower roll, so that both the upper and lower rolls are brought into working contact with the middle roll and under a uniform pressure. This pressure between the upper and middle and middle and lower rolls will be uniform, for the reason that both upper and lower rolls are free to swing in their respective bearings upon crank-shaft $e$ and pivot-bolt $e'$, respectively, toward middle roll, A, and are impelled in such movement by the same distensive force exerted upon the interior peripheries of rings E E. This mode of distending the rings is accomplished by simply rotating crank-shaft $e$ by means of lever G. Presupposing the crank-shaft $e$ and pivot-bolt $e'$ and their respective attachments to be in proper adjustment, the rings E E may be distended so as to put a certain degree of pressure upon the rolls by elevating or depressing the friction-wheels $u$ $u$, attached to the sector-arms $z$ $z$ by means of worms $g$ $g$; and for securing an extreme degree of pressure or a different degree of pressure on opposite sides of the machine, both of the modes of distending the rings last above described may be conjointly employed. The rings E E are constructed from such material and of such form as to possess a certain degree of elasticity, and this attribute of elasticity enters as an important factor into the successful working of my machine. In cases where foreign substances or small obstructions might enter between the crushing-rollers, such as would injure or deface their pulverizing or granulating surfaces, the elastic or yielding quality of the rings will permit the crushing-rolls to separate slightly, so as to allow any ordinary impediment to pass through without injury to the machinery. The rings being either directly or intermediately connected with all the working parts of the apparatus, communicate to all such operative parts the influence of this attribute of elasticity, thus rendering the whole machine susceptible of easy operation and at a greatly reduced outlay of power.

From the foregoing description it will be seen that the three rollers act like two pairs, the upper and middle rollers acting as one pair and the middle and lower rollers acting as the other pair. For the production of certain grades of goods it is sufficient that the grain or other material be passed between one pair of rolls only, and in other cases, when a finer grade is desired, the material may be successively passed through both pairs of rolls. These different results may be provided for by special constructions in the hopper, feed apparatus, chutes, or conveyer-boards, &c., which may be arranged to suit the particular requirements of each particular case, and in conformity with the judgment of the manufacturer or operator. Thus the feed may either pass between the top and middle rollers, B and A, and then between the middle and lower rollers, A and B', thus being crushed twice, or half the feed may pass through the top and middle rollers, and the other half between the middle and lower rollers, as in Figs. 3 and 7. In the latter case the feed falling from the feed-roller J is delivered onto an inclined board, K, having perforations L, which allow one-half of the feed to fall onto another inclined board, M, and the other half onto another inclined board, N. The board M feeds the upper and middle rollers and the board N the middle and lower rollers.

In order to allow the crushed goods from the upper and middle roller to traverse the feed conducted to the middle and lower rollers without mixing, a prismatic casting of the same length as the roller may be interposed, having alternate passages at right angles to each other. This casting also serves as a scraper for the middle roller, and is shown in detail in Fig. 10.

When it is necessary to pass the material but once between the rollers, I have devised special means, shown in transverse section and back elevation in Fig. 11, for cleaning the middle roller and conducting and conveying away the crushed product from the upper pair of rolls. For this purpose I have constructed an inverted-V-shaped scraper, shown in elevation in Fig. 11. The vertex of this scraper is opposite the center of the length of the middle roller, and the two sloping sides or bottom thereof extend the whole length of the rollers, and lead to and communicate with spouts or conductors $S^5$ $S^5$, on the right and left hand sides of the machine, respectively. The edge of this V-shaped scraper on the side next the rollers is accurately fitted to the cylindrical figure of the roller, so that it may maintain contact therewith throughout the entire length of the roller. The crushed material as it is scraped from the upper pair of rollers by the scrapers provided therefor descends to the right and left on the inclined slopes or bottom of scraper $H^5$ and is discharged into the leading-spouts $S^5$ $S^5$, through which it is conducted to the receptacle or chamber underneath, where the two streams unite.

My improved mill differs from others, wherein three or more crushing-rollers arranged in vertical order are employed, in several things. The features of locating the axes of the rolls in different vertical planes and in making the journal-boxes of the middle roller stationary and regulating the pressure by bringing each of the other rollers into interdependent adjustment with it by the mode shown or by any other appropriate mechanism in the employment of anti-friction rings, each revolving upon three friction-rolls, two of which revolve upon or with the axes of the outer rolls and the third upon a stud projecting from an arm pivoted upon and radiating from the axle of the stationary or middle roller, and having concentric adjustment about such axis in the plane of revolution of the ring; and, in combination with the last-described features, means for counterbalancing the weight of the lower roll and its appendages, so as to create an upward pressure against the central roll equivalent to the pressure created between the upper and central rolls by the gravity of the upper roller and its appendages resting or bearing upon the middle or fixed roller.

The mill may be put in adjustment ready for use substantially as follows: The several parts having previously been assembled, substantially as shown in the drawings, the parallelism of the rolls A, B, and B' is established by adjusting the ends of the crank-shaft $e$ and pivot-bolt $e'$ by means of the set-screws connected with the adjustable bearings of said crank-shaft and pivot-bolt provided for that purpose. Then, by means of the set-screws between the bearings of the middle and outside rolls, the rolls are set the desired distance apart, which last adjustment determines the degree of comminution to which the material passing between them is to be reduced. In certain cases, as in the production of a very fine flour or in crushing any material impalpably fine, the adjusting-screws last named may be set so as to allow the adjacent surfaces of the crushing-rolls to meet. When so arranged the sole control of the crushing process devolves on other appliances for regulating the pressure between the rolls. Next in order crank-shaft $e$ is rotated by lever G, so as to throw top roll, B, forward until a moderate degree of tension is felt upon the anti-friction rings E E. If it should then be apparent that such tension is greater on one ring than upon the other, equilibrium therebetween may be established by dropping or depressing friction-wheel $u$ on the side where least tension upon the ring exists. Uniformity of tension upon the rings or of pressure between the crushing-rolls having thus been secured it may afterward be uniformly and simultaneously increased or diminished by the use of lever G of crank-shaft $e$, the principal use of which is to throw the whole pressure either on or off the rolls instantaneously, as emergency or use may require.

From an analysis of the construction and principles of operation of my invention it will be seen that any force or strain existing or created while the mill is in action between either pair of the crushing-rolls which exerts a tendency to force apart or separate such rolls is, through the agency of the anti-friction rings and the several friction-rolls upon which they revolve, communicated to its ultimate abutment of resistance, which, in this case, is the line of contact between the other pair of rolls or on that side of the middle roll opposite where the strain or pressure was generated.

By increasing or diminishing the counterbalance-weights I I the relative pressures between the upper and lower pairs of rolls may be varied at will.

In roller-mills it is important that the feed be uniform, and to this end that a slide be provided to act with the roller J in determining the width of opening through which the grain passes. This slide 20 is shown upon the outside of the hopper P, and it is made adjustable by screws, as shown, so that it may be set and held at the proper place. The feed in the roller-mill has to be entirely stopped when the mill is not running, and in case of temporary obstruction a second slide, 22, is therefore provided, which is shown as upon the inside of the hopper. This has a handle extending above the hopper, so that it may be opened or closed instantly by the attendant.

Having thus described my invention, what I claim as new, and desire to secure by Letters Patent, is—

1. In crushing or pulverizing mills of the character described having the stationary and the adjustable crushing-rolls so disposed that their respective axes of rotation fall in different vertical planes, as shown, the combination of the intermediate stationary roll and upper and lower rolls provided with friction-rollers on each side, adapted to revolve in swinging journal-boxes, which are pivoted by brackets upon adjustable centers of oscillation, with the described elastic revolving anti-friction rings, and the provisions, substantially as shown, for simultaneously distending the same, all arranged to operate substantially as described, and for the purposes set forth.

2. The provisions shown for effecting the independent distension of the revolving rings E E, consisting of sector-arms Z Z, pivoted upon the shaft of the middle crushing-roll, A, friction-wheels $u$ $u$, and provisions, substantially as shown, for circumferentially adjusting the same, in combination with said rings E E, and the several friction-rolls upon the axes of the fixed and swinging rolls with which said friction-wheels $u$ $u$ and rings E E engage when in action, substantially as described, and for the purposes set forth.

3. The combination, with the crushing-rollers, of two rings, within which rings the journals of two of the rollers bear, and mechanism for adjusting the rings laterally and in the line of the plane of their rotation, by moving one of said rollers in a line parallel with said plane, for varying the pressure of the rings on the journals, substantially as specified.

4. In a crushing or grinding mill, the combination, with a roll having stationary bearings, of a roll having a swinging arm at each end of said roll, provided with journal-bearings for said roll in its swinging end, an eccentric adjustable pivot located at the end of said arm, opposite to said journal-bearing, and devices for acting against the journal end of said arm for controlling pressure and adjustment of said roll with reference to the roll mounted in stationary bearings, with which it co-operates, substantially as described, and for the purposes set forth.

5. The scraper $H^5$, composed of two laterally-inclined planes united to form a vertex opposite the middle part of the rolls, the edges of which inclined planes adjacent to the roll are fitted to the surface of the roll along its entire length, so as to act simultaneously to scrape or clean the surface of the roll and divide and conduct the crushed material to each side of the machine, substantially as described, and for the purposes set forth.

6. In combination with the feed-roll of a roller grinding-mill, a feed-hopper above said roll, and two intermediate independent gates, one provided with means for adjusting it accurately and fixing it in place, and the other provided with means whereby it may be opened or closed instantly, substantially as set forth.

ANDREAS MECHWART.

Witnesses:
UNGERLEIDER, BERNÓT,
GÓBORY, JOZSEF.